Figure 4:
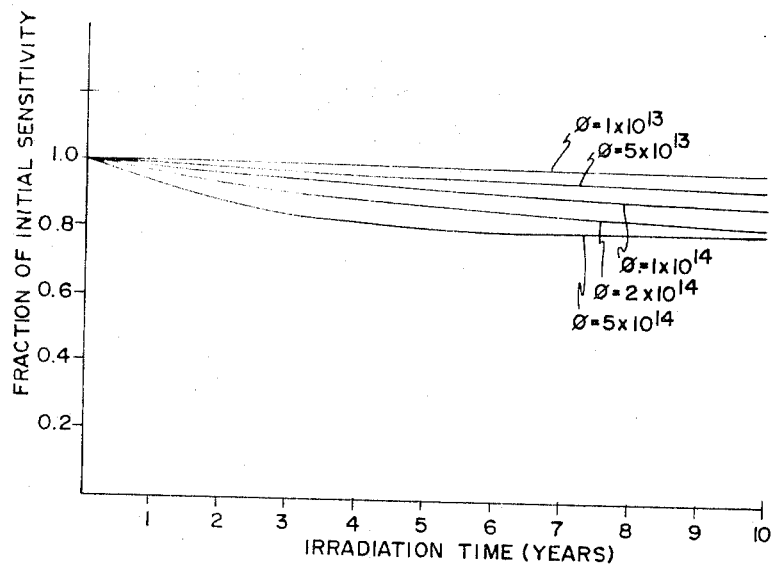

United States Patent [19]
Shields

[11] 3,787,697
[45] Jan. 22, 1974

[54] NEUTRON AND GAMMA FLUX DETECTOR
[75] Inventor: Ross Bisbee Shields, Deep River, Ontario, Canada
[73] Assignee: Atomic Energy of Canada Limited, Ottawa, Ontario, Canada
[22] Filed: Oct. 8, 1971
[21] Appl. No.: 187,769

[30] Foreign Application Priority Data
Jan. 19, 1971 Canada.............................. 103078

[52] U.S. Cl..................... 250/390, 250/393, 313/61
[51] Int. Cl. .............................................. G01t 3/00
[58] Field of Search .. 313/61 D; 250/83.1, 390, 393

[56] References Cited
UNITED STATES PATENTS
2,989,662  6/1961  Linden............................. 313/61 D
3,603,793  9/1971  Warren............................. 313/61 D
3,375,370  3/1968  Hilborn............................ 250/83.1
2,462,471  2/1949  Crumrine.......................... 313/61 D

*Primary Examiner*—James W. Lawrence
*Assistant Examiner*—B. C. Anderson
*Attorney, Agent, or Firm*—James R. Hughes

[57]     ABSTRACT

A neutron and gamma flux detector having a prompt response in providing an electrical current when disposed in neutron and gamma flux is provided, comprising a central emitter of platinum, cerium, osmiun or tantalum, compressed magnesium oxide electrical insulation around the emitter, and an Inconel outer tubular collector enclosing the emitter and spaced from it by the electrical insulation.

1 Claim, 5 Drawing Figures

SHEET 1 OF 2
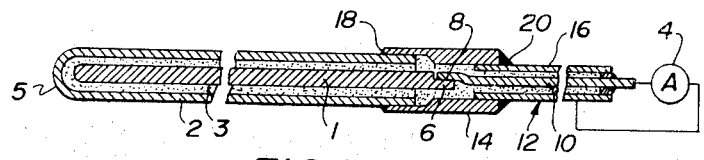
FIG.1.
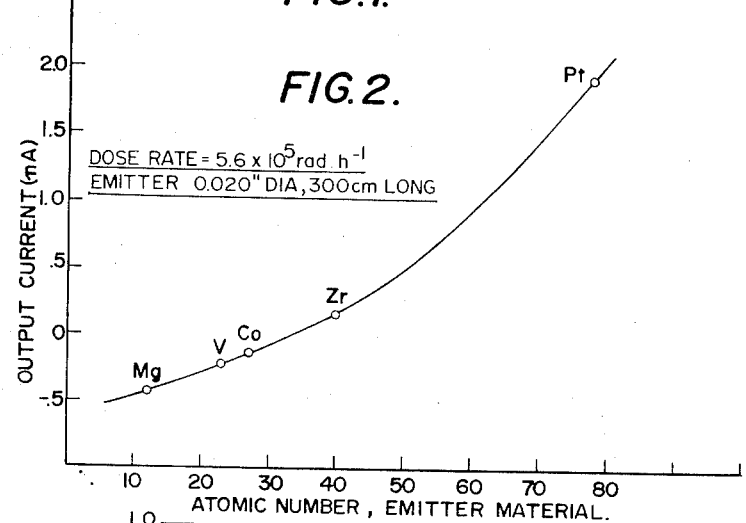
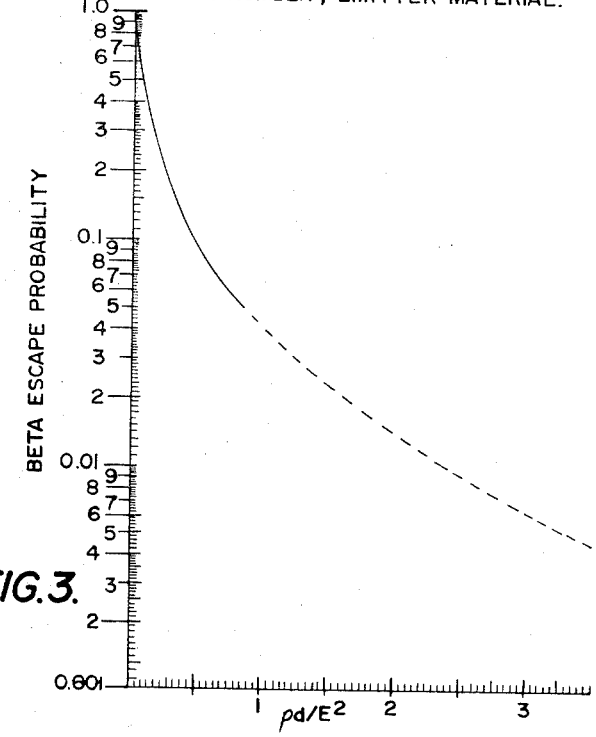

NEUTRON AND GAMMA FLUX DETECTOR

This invention relates to a neutron and gamma flux detector which is particularly useful for neutron and gamma flux measurements in nuclear reactors. A neutron and gamma flux detector of the invention is also useful for mapping flux intensities in nuclear reactor cores.

It has already been proposed in U.S. Pat. No. 3,375,370, dated Mar. 26, 1968, J.W. Hilborn, to provide a "self powered" neutron detector capable of long term operation in the core of a nuclear reactor. The "self powered" neutron detector comprises, for example, a central rhodium, vanadium or silver emitter, coaxially disposed within a stainless steel collector, and magnesium oxide as electrical insulation between the emitter and collector. The emitter and collector are connected by the inner and outer conductors respectively, of a coaxial cable to a current measuring device.

When the neutron detector is within a neutron flux the emitter produces energetic electrons following the absorption of neutrons, whilst the collector in the same manner produces fewer energetic electrons than the emitter. Consequently an electrical current difference is produced between the emitter and the collector, and the magnitude of this current difference indicated on the current measuring device is a measure of the intensity of the neutron flux within which the neutron detector is disposed.

With this neutron detector the principal source of energetic electrons in the emitter is due to beta decay of the absorbed neutron capture products. Hence, the major part of the response, that is the electrical current being recorded on the current measuring device, is delayed with a time constant of 1.44 times the half-life of the capture products.

Various subsequent proposals for detectors of this general class have been directed towards increasing the speed of response. In one such proposal the neutron detector, which is primarily neutron flux sensitive, depends on the emission of photo-electric and Compton-interaction produced electrons from cobalt, which are produced in the cobalt by capture gamma rays in it. Although the response of this neutron detector at the beginning of its insertion in neutron flux is essentially 100 percent prompt, after long exposure to a neutron flux of high intensity the signal composition becomes complex because of delayed emissions from the cobalt of the capture products $Co^{60}$ and $Co^{61}$.

A more recent proposal is a gamma detector having a low sensitivity to neutron flux, that is one having a low neutron capture cross-section emitter, such as a zirconium emitter. A prompt output of an electrical current from this gamma detector depends on the production and subsequent interaction of electrons in emitter and collector materials with different atomic numbers. In a gamma flux, energetic electrons are also produced in this type of detector as a result of photo-electric and Compton-interaction; the material having the higher atomic number has the greater number of energetic electrons produced in it. Consequently the intensity of the current indicated on the current measuring device depends on the difference in the atomic numbers of the emitter and collector materials.

The chief drawback of a gamma detector having a zirconium emitter is its low electrical current output, and the accompanying difficulty of eliminating undesired delayed electrical currents in the output due to the activation of impurities in the emitter and collector materials. The worst impurity has been found to be manganese in the collector, a concentration of only 0.2 percent maximum by weight manganese in the best reactor grade Inconel, produces a 2.5 hour output component in the electrical current output of the gamma detector, and this amounts to about 15 percent of the total electrical current output. Reactor grade Inconel is a nickel base alloy containing chromium and iron, wherein the cobalt content is limited to 0.1 percent maximum by weight, and as stated above the manganese content is limited to 0.2 percent maximum by weight.

The question as to which flux intensity measurement, neutron or gamma, is the most useful to make is presently controversial, and depends greatly on the particular application to which the detector is put. Both of these measurements are ultimately related to fission rate and both have been used with reported advantages as measurements of nuclear reactor power. In many situations the neutron and gamma flux intensities are closely proportional, and within a few percent of one another, because a substantial part of the gamma flux intensity arises from neutron capture in the reactor components.

If detectors are required to respond to either neutron or gamma flux intensities, it is hard at the present time to find emitter materials, from among the naturally occurring elements, with superior characteristics to those described above, when one takes into account the additional requirements of satisfactory physical and mechanical properties.

The inventor has now found that if one is prepared to consider a detector that will simultaneously respond to the intensities of mixed flux, that is both the neutron and gamma flux intensities at once, for emitters of a few elements, the total prompt electrical current output in response to a flux intensity can be relatively high when compared with known detectors, in fact it can be as high as in the neighborhood of 95 percent.

It is an object of the present invention to provide a flux detector that will simultaneously totally respond in a prompt manner to the intensities of neutron and gamma flux to provide an electrical current output having a magnitude dependant upon both the neutron and gamma flux intensities of a field.

According to the invention there is provided a neutron and gamma flux detector, comprising an electrically conductive emitter which produces an electrical current when disposed in neutron and gamma flux, an electrically conductive collector which produces an electrical current of different magnitude than the emitter when disposed in the same neutron and gamma flux, and electrical insulating material electrically insulating the emitter from the collector, and means for measuring the magnitude of an electrical current difference between the emitter and the collector as an indication of the intensities of the neutron and gamma flux within which the detector is disposed, the improvement comprising the emitter is of a material selected from the group platinum, cerium, osmium and tantalum.

Detectors of the invention are particularly useful in a fast reactor where the thermal neutron flux is low but the gamma-ray flux is high. It is believed that at the present time there is no equivalent fast neutron detector available, and a slow neutron detector such as cobalt would be subject to considerable interference from gamma-rays, especially since the gamma-ray sensitivity is of opposite polarity to the neutron flux sensitivity. A detector of the invention having a platinum emitter on the other hand would respond mainly to gamma-rays when used in this manner.

Figure 5:
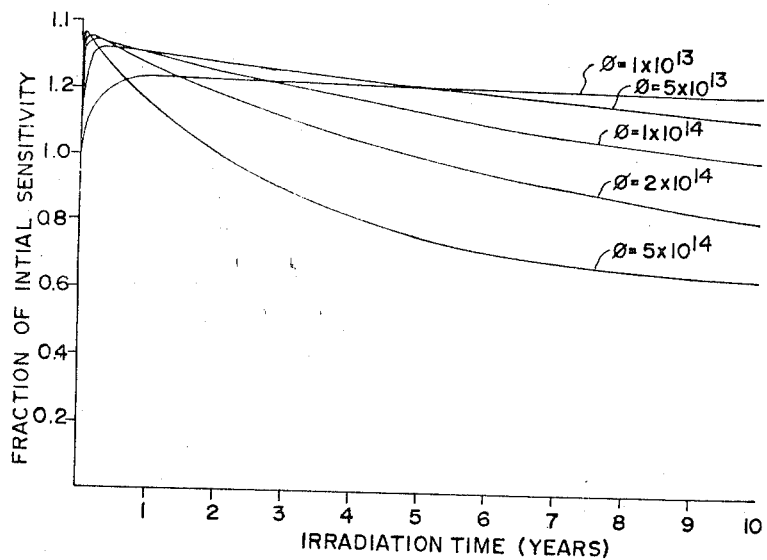

In the accompanying drawings which illustrate, by way of example, embodiments of the invention, FIG. 1 is a sectional side view of a neutron and gamma flux detector, FIG. 2 is a graph of the electrical current output of the detector shown in FIG. 1, plotted against the atomic number of the emitter material, FIG. 3 is a graph of the beta escape probability of the detector shown in FIG. 1 plotted against an empirical quantity dependant upon the emitter material, FIG. 4 is a graph of the sensitivity as a fraction of the initial sensitivity for the detector shown in FIG. 1 having a platinum emitter, plotted against the irradiation time, and FIG. 5 is a graph of the sensitivity as a fraction of the initial sensitivity for the detector shown in FIG. 1 having a tantalum emitter plotted against the irradiation time.

In FIG. 1 there is shown an electrically conductive emitter 1 which produces an electrical current when disposed in neutron and gamma flux, an electrically conductive collector 2 which produces an electrical current of different magnitude than the emitter when disposed in the same neutron and gamma flux, an electrical insulating material 3 electrically insulating the emitter 1 from the collector 2, and means 4 for measuring the magnitude of an electrical current difference between the emitter 1 and the collector 2 as an indication of the intensities of the neutron and gamma flux within which the detector is disposed. The emitter is of a material selected from the group platinum, cerium, osmium and tantalum, and is preferably of platinum.

This neutron and gamma flux detector was intended for use in the core of a nuclear reactor where mixed radiaton is present, and so the metal from which the collector 2 was made was chosen from those commercially available which contain the least number of elements, and quantities thereof, which activate appreciably in neutron and gamma flux. For this reason a collector 2 was made from a material selected from the group titanium, stainless steel, nickel base alloys and chromium base alloys, with the material containing less than 0.1 percent by weight cobalt and less than 0.2 percent by weight manganese.

The preferred material for the collector 2 was a nickel base alloy containing by weight 76 percent nickel, 15.8 percent chromium 7.20 percent iron, 0.20 percent silicon, 0.10 percent copper, 0.007 percent sulphur, and 0.04 percent carbon, with less than 0.1 percent by weight cobalt and less than 0.2 percent by weight manganese.

For this type of detector activation products that are beta emitters are undesirable, and because of this it would have been desirable to limit the manganese content to less than 0.05 percent by weight, but as such a nickel base alloy was commercially available only as a special melt this was not done.

Preferably a collector 2 of aluminum is not used where neutron radiation is present because of the relatively high beta emissions from aluminum in neutron flux in comparison with the above mentioned materials.

More specifically a 300 cm long by 0.508 mm diameter platinum emitter 2, having compressed metal oxide powder, for example, magnesium oxide powder, electrical insulation 3 around it, was encased within a 1.57 mm outside diameter by 0.254 mm wall thickness tuubular collector of a nickel base alloy comprising by weight 76 percent nickel, 15.8 percent chromium, 7.20 percent iron, 0.20 percent silicon, 0.10 percent copper, 0.007 percent sulphur and 0.04 percent carbon, with less than 0.1 percent by weight cobalt and less than 0.2 percent by weight manganese. The tubular collector 2 had a closed end 5.

The emitter 1 had a flat end 6 joined by a metalurgical bond 8 to an inner conductor 10 of a coaxial cable 12. A metal splicing sleeve 14 is slid over the end of the tubular collector 2 and an end of an outer conductor 16 of the coaxial cable 12, and is sealed by electrically conducting seals to these members by brazes 18 and 20 respectively. The outer conductor 16 and the splicing sleeve 14 are of the same nickel base alloy as the tubular collector 2. The space between the splicing sleeve, and emitter 1 and inner conductor 10 is also filled completely with magnesium oxide. The complete assembly is hermetically sealed by seal 11 which may be an epoxy resin seal or a glass seal after outgassing should this be necessary.

The means 4 comprises an electrical current meter electrically connected to the inner conductor 10 and the outer conductor 16.

CALCULATION OF DETECTOR CURRENT OUTPUT RESPONSE

The calculation of the output arising from each of the three main current-producing mechanisms is based on direct experimental data obtained from several years experience with detectors of each basic type and thus involves a higher level of confidence than is possible at present using analytical methods alone. The evaluation is based on a detector constructed according with FIG. 1, which corresponds dimensionally to those from which the experimental data was obtained. THe output current components are calculated for a thermal flux of $1.0 \times 10^{-14}$ n.cm$^{-2}$.s$^{-1}$ with an accompanying gamma-ray intensity of $1.2 \times 10^8$ rad.h$^{-1}$, typical of conditions in the moderator of a heavy water, natural uranium, reactor. For comparison, several elements are included that are not acceptable because of their large delayed output.

THE GAMMA-RAY CURRENT OUTPUT COMPONENT

The output currents due to gamma rays $I_\gamma$ are obtained from the experimental curve shown in FIG. 2 where output current is plotted against the atomic number of the emitter material, and are listed in Table 1.

TABLE 1

| Emitter Material | | Atomic Number | $I_\gamma$ (nA) |
| --- | --- | --- | --- |
| Palladium | (Pd) | 46 | 75 |
| Cerium | (Ce) | 58 | 170 |
| Tantalum, | (Ta) | 73 | 335 |
| Tungsten | (W ) | 74 | 350 |
| Osmium | (Os) | 76 | 375 |
| Platinum | (Pt) | 78 | 400 |

THE NEUTRON CAPTURE PROMPT OUTPUT CURRENT COMPONENT

The current $I_{n\gamma}$, due to electron emission as a result of neutron capture in the emitter material can be expressed by the equation, $I_{n\gamma} = (k\, N_o\, \sigma\, \phi\, M\, e/A)$
where: $k$ is the net electron conversion efficiency; (the value used was 0.018, obtained with a cobalt emitter in the embodiment shown in FIG. 1.)

$N_o$ is Avogadro's number = $6.02 \times 10^{23}$ atoms/mole;

$\sigma$ is the effective thermal neutron capture cross section of the emitter with natural isotopic abundances;

$\phi$ is the thermal neutron flux;

$M$ is the mass of emitter material $e$ is electronic charge = $1.59 \times 10^{-19}$ C.

$A$ is atomic weight of the emitter material.

The calculated values using the above formula for the various emitters are given in Table II below.

TABLE II

| Emitter material | | $\sigma$ | M | A | $I_{n\gamma}$(nA) |
|---|---|---|---|---|---|
| Palladium | (Pd) | 8.0 | 7.4 | 106.4 | 96 |
| Cerium | (Ce) | 0.73 | 4.2 | 140.0 | 3.8 |
| Tantalum | (Ta) | 21.1 | 10.1 | 180.9 | 205 |
| Tungsten | (W) | 19.2 | 11.8 | 183.8 | 213 |
| Osmium | (Os) | 15.3 | 13.7 | 190.2 | 192 |
| Platinum | (Pt) | 10.1 | 13.0 | 195.1 | 117 |

THE BETA RAY OUTPUT CURRENT COMPONENT

The equilibrium output current $I_{n\beta}$ from each beta emitting capture product, assuming first capture only, is given by $I_{n\beta} = (N_o\, \sigma\, \phi\, M\, e\, R\, P/A)$
where: $N_o$, $\phi$, $M$, $e$ and $A$ are as above $\phi$ is the thermal neutron capture cross section leading to each beta emitter;

$R$ is the abundance of each parent isotope;

$P$ is the beta escape probability.

The beta escape probability was obtained from the curve shown in FIG. 3 where the beta escape probability is plotted against the abscissa $\rho d/E^2$, where $\rho$ is emitter density ($gm/cm3$) $d$ is emitter diameter ($cm$) and $E$ is the maximum beta energy ($MeV$). The abscissa $\rho d/E^2$ is an empirical quantity that has been found to satisfactorily align experimental values for escape efficiency from several different elements. Where more than one beta transition occurs, $P$ is a mean value weighted according to the fraction at each energy.

The calculated beta currents are listed in Table III below.

TABLE III

| Emitter material | | $\sigma$ | R | P | $I_{n\beta}$(nA) |
|---|---|---|---|---|---|
| Palladium | (Pd) 109 | 12 | .267 | .08 | 170 |
| | (Pd) 111 | 0.2 | .118 | .36 | 5.6 |
| | (Pd) 111m | 0.04 | .118 | .30 | 0.9 |
| Cerium | (Ce) 141 | 0.6 | .885 | .03 | 4.6 |
| | (Ce) 143 | 1 | .111 | .18 | 5.7 |
| Tantalum | (Ta) 182 | 21 | 1.0 | .004 | 44.8 |
| Tungsten | (W) 185 | 2.1 | .306 | .0015 | 0.6 |
| | (W) 187 | 40 | .284 | .081 | 561 |
| Osmium | (Os) 191 | 3.9 | .264 | .000(1) | 0.07 |
| | (Os) 193 | 1.6 | .41 | .05 | 22.5 |
| Platinum | (Pt) 197 | 0.9 | .252 | .02 | 2.9 |
| | (Pt) 199 | 4 | .072 | .12 | 22 |

The signal contributions from each of the three mechanisms are summarized in Table IV. For two of the elements, palladium and tungsten, the delayed output due to beta decay is more than 50 percent of the total signal and is unacceptable. However, for the others, cerium, tantalum, osmium and platinum, the delayed output is tolerably small, in fact much less than in our present zirconium detector.

Of these four elements the ultimate choice will depend on what properties may be of importance to the user, such as total sensitivity, the change of sensitivity with time and the half-life of the delayed component. Cerium will change least with irradiation, not only because its cross section is low but because only 2 percent of its output is subject to depletion; however, its sensitivity is low. For platinum, the short half-life of the delayed component may be an advantage and its total sensitivity is quite high. The loss of sensitivity with irradiation as a fraction of the initial sensitivity plotted against the irradiation time in years for a detector having a platinum emitter is shown in FIG. 4, from which it will be seen that the loss is moderate. The maximum loss is 22 percent, 90 percent of which is due to $Pt^{195}$, with a cross section of 27 barns. For osmium, 33 percent of the output is subject to depletion but it is not possible at present to estimate the rate since the cross section of the isotopes contributing most are not known.

TABLE IV
(Output current components as a percentage of the total)

| Emitter material | Total output (nA) | Prompt | | Delayed | |
|---|---|---|---|---|---|
| | | $I_c$(%) | $I_{n\gamma}$(%) | $I_{n\beta}$(%) | $T^{1/2}$ |
| Palladium (Pd) | 348 | 21 | 28 | 49 | 13.5 h. |
| | | | | 1.6 | 22 min. |
| | | | | 0.3 | 5.5 h. |
| Cerium (Ce) | 184 | 92 | 2 | 2.5 | 33 d. |
| | | | | 3.1 | 33 h. |
| Tantalum (Ta) | 585 | 57 | 35 | 7.7 | 115 d. |
| Tungsten (W) | 1125 | 31 | 19 | 0.5 | 75 d. |
| | | | | 50 | 24 h. |
| Osmium (Os) | 590 | 64 | 33 | 0.01 | 15 d. |
| | | | | 3.8 | 31 h. |
| Platinum (Pt) | 542 | 74 | 2 | 0.5 | 19 h. |
| | | | | 4.1 | 30 min. |

The behaviour of tantalum with irradiation is rather unusual as a result of the long half-life and high cross section of the main capture product, $Ta^{182}$ (115 d, 8,000 barns). Hence $Ta^{182}$ burns up almost as fast as it is produced and the net beta component is less than one-tenth of the value given in Table IV. Moreover, the gamma rays from this second capture add about one-third to the early sensitivity. The calculated behaviour of tantalum is shown in FIG. 5 where sensitivity as a fraction of the initial sensitivity is plotted against irradiation time in years. While the sharp rise in output during the first year might be considered an undesirable complication, the prompt output fraction is the highest of the group, over 99 percent and, as far as we can see, should not drop appreciably after long exposure.

EXPERIMENTAL EVALUATION

Platinum was selected as the emitter material for prototype evaluation as having the most generally acceptable properties. Two detectors of the type shown in FIG. 1 were made with the emitter diameters slightly below nominal, that is 0.432 mm instead of 0.508 mm, but this did not seriously affect their characteristics. The data given below was based on tests with the two detectors installed in a natural uranium reactor. For all irradiations the detectors were close-coiled on 9.52 mm outside diameter metal alloy tube of by weight 1.20 to 1.70 percent tin, 0.07 to 0.20 percent iron, 0.05 to 0.15 percent chromium, 0.03 to 0.08 percent nickel, 1,000 to 1,400 ppm oxygen, balance zirconium except for impurities.

The gamma sensitivity averaged $3.4 \times 10^{-15}$ $A/(rad.h^{-1})$ at 1.25 $MeV$ and $2.8 \times 10^{-15}$ $A/(rad.h^{-1})$ at 0.25 $MeV$ as measured in a $Co^{60}$ Gammacell. The low energy value was obtained from a shielding experiment involving a component of lower intensity so the accuracy is poorer. However, it indicates that the sensitivity of the detector having a platinum emitter is much less energy dependent than say a detector having a zirconium emitter.

From Table IV the calculated total in-reactor sensitivity for a platinum emitter 0.508 mm diameter is $5.4 \times 10^{-21}$ $A/(n.cm^{-2}.s^{-1})$. For the emitter diameter actually used, that is 0.432 mm diameter, this would be $4.4 \times 10^{-21}$ $A/(n.cm^{-2}.s^{-1})$. The measured sensitivity in the NRU research reactor was $3.7 \times 10^{-21}$ $A/(n.cm^{-2}.s^{-1})$, which is in reasonable agreement.

For the delayed fraction, the average of three measurements was 5.3 percent compared to a calculated value of 4.6 percent.

The four month irradiation in a flux of about $10^{14}$ $n.cm^{-2}.s^{-1}$ has been too short to produce any observable decrease in sensitivity which according to the estimate in FIG. 4 should be only about 2 percent in the first year.

Thus the invention provides neutron and gamma flux detectors having emitters of platinum, cerium, osmium or tantalum, which materials have been regarded previously as unsuitable for emitters for what are known as self-powered detectors. Detectors of the invention are capable of giving and maintaining a higher proportion of prompt response than has been achieved to date in known detectors of the primary emission type. Detectors according to the invention are characterized by the following desirable properties:

good sensitivity a prompt component close to 95 percent or more an in-reactor sensitivity which is partly due to gamma-rays and partly due to neutron capture low to moderate decrease in sensitivity with irradiation relatively flat gamma energy response.

It will be appreciated that there is no basic reason for the detector to be constructed coaxially as shown in FIG. 1, other than the convenience of an established method of manufacture for detectors of this type which is known to the inventor. Detectors of the invention may be constructed, for example, as a flat sandwich or a roll.

I claim:

1. A neutron and gamma flux detector, comprising an electrically conductive emitter which produces an electrical current when disposed in neutron and gamma flux, an electrically conductive collector which produces an electrical current of different magnitude than the emitter when disposed in the same neutron and gamma flux, an electrical insulating material electrically insulating the emitter from the collector, and means for measuring the magnitude of an electrical current difference between the emitter and the collector as an indication of the intensities of the neutron and gamma flux within which the detector is disposed, the improvement comprising the emitter is of a material selected from the group consisting of platinum, cerium, osmium and tantalum.

* * * * *

UNITED STATES PATENT OFFICE
CERTIFICATE OF CORRECTION

Patent No. 3,787,697             Dated January 22, 1974

Inventor(s) Ross Bisbee Shields

It is certified that error appears in the above-identified patent and that said Letters Patent are hereby corrected as shown below:

Column 6, Table IV, under $I_{n\gamma}$, against "Platinum $(P_t)$", "2" should read -- 22 --.

Signed and sealed this 1st day of October 1974.

(SEAL)
Attest:

McCOY M. GIBSON JR.          C. MARSHALL DANN
Attesting Officer            Commissioner of Patents